US009888394B2

(12) United States Patent
Rajendran et al.

(10) Patent No.: US 9,888,394 B2
(45) Date of Patent: Feb. 6, 2018

(54) ROUTE RECOMMENDATIONS

(71) Applicant: Verizon Patent and Licensing Inc., Arlington, VA (US)

(72) Inventors: Sridevi Rajendran, Chennai (IN); Prabhu V. Mohan, Chennai (IN); Vijay A. Senthil, Chennai (IN); Vinodkrishnan Surianarayanan, Chennai (IN); Ramya Sundarraman, Chennai (IN); Rajasundaram Ganesan, Chennai (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 56 days.

(21) Appl. No.: 14/833,730

(22) Filed: Aug. 24, 2015

(65) Prior Publication Data

US 2017/0059342 A1    Mar. 2, 2017

(51) Int. Cl.
*H04W 24/02* (2009.01)
*G01C 21/34* (2006.01)

(52) U.S. Cl.
CPC ........ *H04W 24/02* (2013.01); *G01C 21/3461* (2013.01); *G01C 21/3484* (2013.01)

(58) Field of Classification Search
None
See application file for complete search history.

(56) References Cited

U.S. PATENT DOCUMENTS

| 8,972,171 | B1* | 3/2015 | Barth | G01C 21/3492 340/995.13 |
| 2011/0125392 | A1* | 5/2011 | Hao | G08G 1/0104 701/118 |
| 2011/0125583 | A1* | 5/2011 | Hao | G01C 21/3492 705/14.64 |
| 2014/0172571 | A1* | 6/2014 | Fabrikant | G06Q 30/0261 705/14.58 |
| 2015/0253144 | A1* | 9/2015 | Rau | G01C 21/3415 705/348 |

* cited by examiner

*Primary Examiner* — James M McPherson

(57) ABSTRACT

A method includes receiving, at route recommendation server device, travel data associated with a plurality of mobile devices. The method includes indexing segments of a plurality of routes based on a corresponding number of users of each of the plurality of segments, and receiving a recommendation request from a particular mobile device. The recommendation request includes a starting point and a destination for a trip. The method also includes identifying a plurality of routes between the starting point and the destination based on the travel data, and providing at least one recommendation for a recommended route based on a relative popularity of the recommended route among a number of users that use each of the plurality of routes.

20 Claims, 8 Drawing Sheets

ROUTE RECOMMENDATIONS

BACKGROUND

Mobile devices have traditionally included some form of position determination capability to assist users with navigational tasks and/or provide users with services that rely on geographic information, such as emergency services, etc. Mobile devices commonly use on-board Global Positioning System (GPS) receivers for fast and accurate position determination. More recent developments include social navigation techniques which further leverage the wireless communications network to supplement position data with additional information provided by other users within the network.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Embodiments described herein are directed to a system that may determine and provide route recommendations in response to requests from user device. The system may determine recommendations based on routes traveled by previous users that correspond to a requested itinerary. A route recommendation server may collect travel data associated with motor vehicles transmitted from route recommendation clients (on mobile devices or installed in the motor vehicles) via mobile networks. Routes associated with each user (or route recommendation client, motor vehicle, etc.) may be stored in the route recommendation server.

In instances in which a user searches for (or requests) a recommended route, the route recommendation server may retrieve usage statistics associated with the start and destination points. The route recommendation server may determine and suggest a most optimal route to the users along with the other recommended route at that time of the day based on, for example, the statistics over a predetermined or selected time period.

Consistent with embodiments described herein, a recommendation server may allow a user to filter routes for the most (and/or least) used route for a particular time period. The user may find the number of users following a particular route from a source (or starting point) to a destination (.e.g., particular map coordinates or GPS address). The route recommendation server may incorporate additional factors to determine a most popular route, such as toll road and highway preferences, scenic views, etc.

Figure 1:
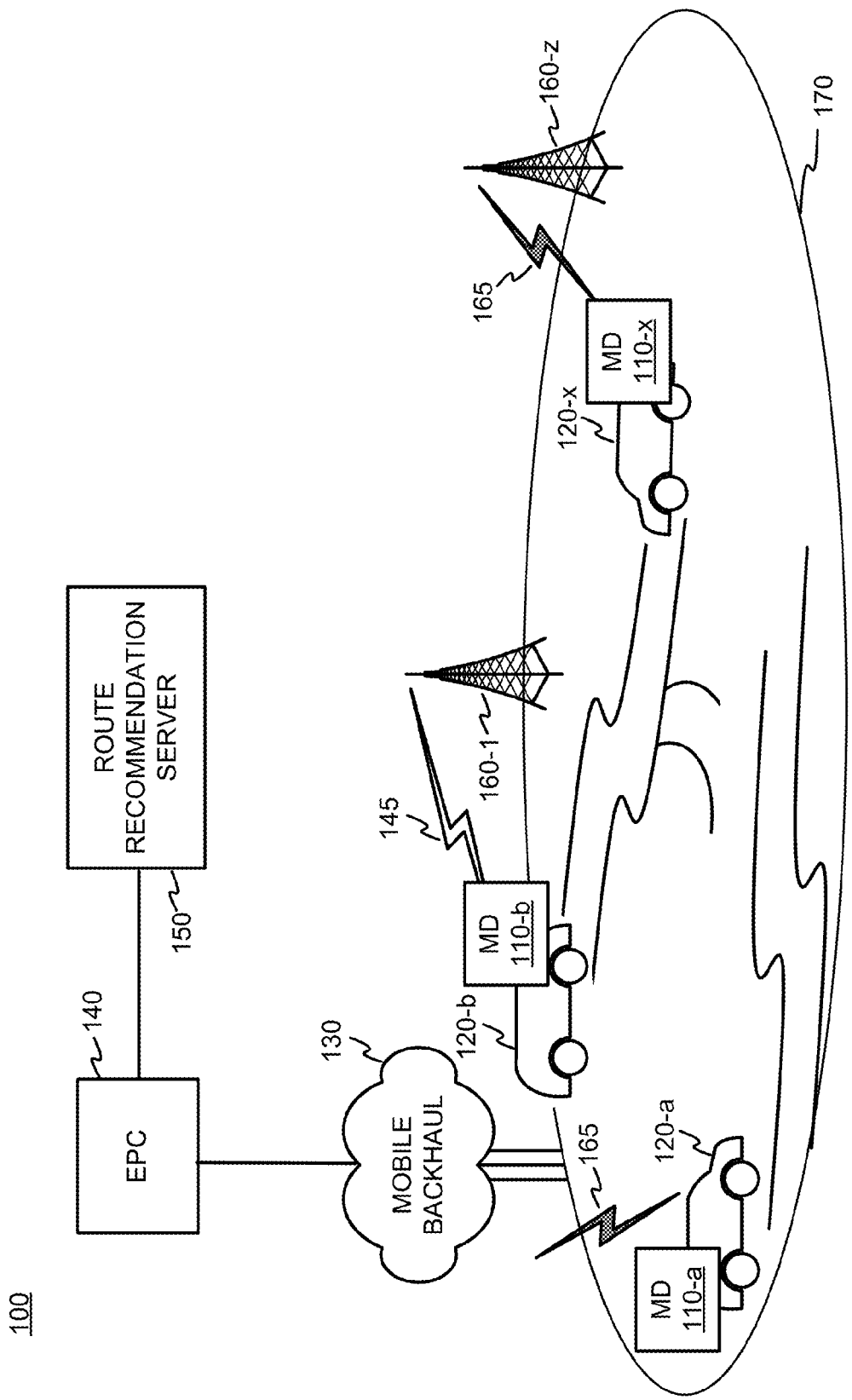
FIG. 1 is a diagram showing an exemplary environment associated with a route recommendation system (RRS)

FIG. 1 is a diagram showing an exemplary environment 100 associated with a route recommendation system. Environment 100 may include mobile devices 110-a to 110-x (collectively referred to in plural as mobile devices 110 or individually as mobile device 110), which may correspond to (or be associated with) motor vehicles 120-a to 120-x (collectively referred to in plural as motor vehicles 120 or individually as motor vehicle 120), and a route recommendation server 150. Mobile devices 110 may communicate with route recommendation server 150 using a network(s) 170 based on Long Term Evolution (LTE) wireless standards (e.g., LTE, LTE Advanced, etc.). Network 170 may include a mobile backhaul 130, an evolved packet core (EPC) 140, and a plurality of access nodes 160-1 to 160-z (herein referred to in plural as "access nodes 160," generically as "access node 160," and individually as "access node 160-x"). Access nodes 160 may also be referred to as base stations or eNodeBs. While the embodiment shown in FIG. 1 uses an LTE based system, other wireless standards (or combination of standards) may be used in other embodiments. For example, Global System for Mobile (GSM) standards may be used in other implementations.

Mobile devices 110 may collect travel data 165 for motor vehicles 120 and allow the users to request and receive route recommendations from route recommendation server 150, such as described below with respect to FIGS. 2 and 4. Motor vehicles 120 that are equipped or associated with appropriate mobile devices 110 may send information regarding routes requested by the user to route recommendation server 150. Each mobile device 110 may also transmit travel data associated with each route traveled to route recommendation server 150. The travel data may include a current position of the vehicle (which may be provided by a Global Positioning System (GPS) receiver), speed (or velocity), a time at which the motor vehicle is traveling, etc.

Route recommendation server 150 may receive requests and provide route recommendations to user devices 110, as described herein below with respect to FIGS. 5-8. Route recommendation server 150 may analyze travel data and consolidate multiple traffic route data for motor vehicles 120 based on similar routes and associated travel data, such as a time of day, type of road (e.g., highway or local roads), etc. Route recommendation server 150 may retrieve usage statistics associated with the start and destination points in response to requests for route recommendations from mobile devices 110. Route recommendation server 150 may determine and provide a recommendation 145 for an optimal route to the mobile device 110 along with other recommended routes.

Route recommendation server 150 may be implemented as a general processor-based system executing software (e.g., a server or other network element), or embodied using dedicated hardware (e.g., application-specific integrated circuits (ASICs), field-programmable gate arrays (FPGAs), etc.), or as a combination thereof Route recommendation server 150 may interface to EPC 140 thorough a wide area network (WAN), or may alternatively connect to EPC 140 through a local interface, such as a local area network (LAN).

Access node 160 may be any type of base station that can be included within any type of radio access network, and can be compatible with known wireless standards. Such standards may include, for example, LTE, LTE Advanced, GSM, Universal Mobile Telecommunications System (UMTS), information system 2000 (IS-2000), etc. In some embodiments, access node 160 may be a wireless access point which can service any type of Wi-Fi standard (e.g., any institute IEEE 801.11x network, where x=a, b, c, g, and/or n), and/or include any other type of wireless network technology for covering larger areas, and may include a mesh network (e.g., IEEE 801.11s) and/or or a worldwide interoperability for microwave access (WiMAX) IEEE 802.16.

Mobile backhaul network 130 may be any type network which supports one or more access nodes 160 for interfacing with EPC 140. Mobile backhaul network 130 may include Cell Site Routers (CSRs), Extended Backhaul (EBH) network(s), optical networks which include wavelength division multiplexed (WDM) optical components, multiservice provisioning platforms (MSPPs), metro-Ethernet networks, etc.

EPC 140 may be a core networking infrastructure that provides mobility management, session management, Multimedia Broadcast Multicast System (MBMS) (e.g., evolved Multimedia Broadcast Multicast System (eMBMS)) functionality, authentication, and packet transport to support mobile devices 110 and access nodes 160 for wireless communication, including travel data 165 and route recommendation requests 145. EPC 140 may be compatible with known wireless standards, such as those described above. EPC 140 may further include network entities (not shown in FIG. 1), such as a serving gateway (SGW) device, a packet data network (PDN) gateway (PGW), a Policy and Charging Rules Function (PCRF), a mobility management entity (MME), a home subscriber server (HSS), a Multicast Coordination Entity (MCE), and a Multimedia Broadcast Multicast System Gateway (MBMS-GW).

In implementations described herein, route recommendations between a particular location and destination may be provided based on the popularity of routes traveled by users. The recommended routes may be sorted or ranked based on popularity and additional factors, such as types of roads, time of day, tolls, etc. In implementations, the routes may be sorted based on additional factors or combination of factors, such as road surface information, safety condition information (based on, for example, past accident records, re-paving status, line painting); etc. The methods may provide route recommendations based on routes traveled by previous users with corresponding (or matching) travel parameters.

Figure 2:
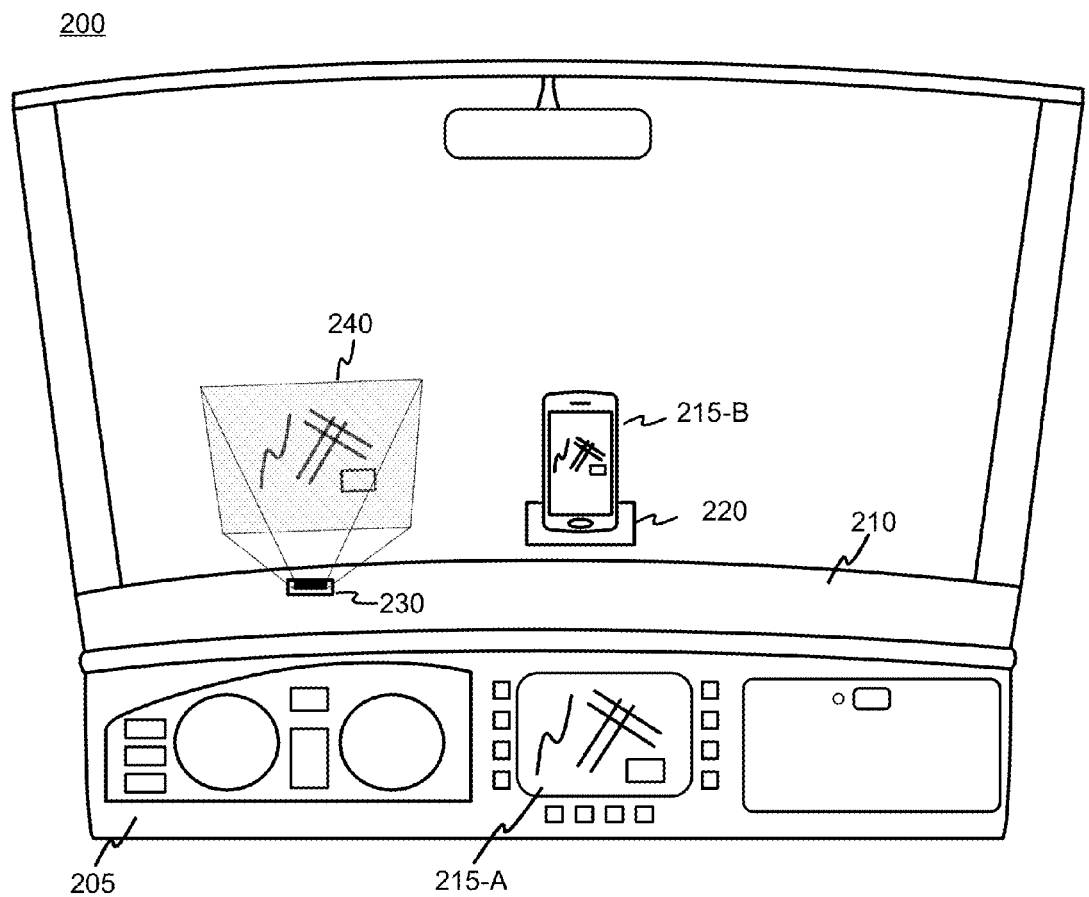
FIG. 2 is a diagram illustrating an interior of a vehicle showing different embodiments of a user device.

FIG. 2 is a diagram illustrating a vehicle interior 200 showing two exemplary embodiments of user equipment (UE) that may include mobile device 110. The perspective shown in FIG. 2 is from the viewpoint of a front-seat occupant looking towards the front of the vehicle, showing a dashboard 205 underneath dash pad 210. Vehicle interior 200 includes a UE 215 (referred to generically as "UE 215," plurally as "UEs 215," and specifically as "UE 215-A" or "UE 215-B," when referring to particular embodiments). In an embodiment, vehicle interior 200 may further include a "Heads—Up" Display (HUD) unit 230.

UE 215 may include a user interface which supports a map and/or user interface elements to permit a driver of the vehicle to request route recommendations and wirelessly transmit travel data to route recommendation server 150. UE 215 may include position determination capabilities to include the position of the vehicle in the travel data. UE 215 may include additional user interface elements so that the driver may request a most (or least) used route for a particular time period and filter routes based on particular factors, such as a time period, speed limits, etc. (e.g., most/least used route in the last 3 months or most/least used route in the morning). The time period may correspond to a particular repeating time window (e.g., Tuesday mornings, 6 AM to 10 AM). In some instances, the systems may allow the user to select a least used route that may correspond to a lowest volume of traffic. Alternatively or additionally, UE 215 may receive voice inputs from the driver, and use voice recognition algorithms to extract information to generate the route recommendation requests.

In one embodiment, UE 215-A may be realized as device built into dashboard 205, and serve as a navigation system and user interface that may wirelessly connect to route recommendation server 150 using an on-board transceiver. The on-board transceiver associated with UE 215-A may be integral to the chassis associated with the display shown in FIG. 2, or may be included in a separate chassis which is functionally connected to the chassis. The user may enter inputs using a touch screen associated with UE 215-A, other user physical input devices (e.g., a joystick, a touch pad, dial(s), buttons, etc.), and/or voice recognition. UE 215-A may have the ability to download additional software in the form of applications (i.e., "apps"), which may be provided by route recommendation server 150, in order to provide UE 215-A with the ability to request and receive recommendations and send travel data to route recommendation server 150.

In another embodiment, UE 215-B may be a separate mobile device which can be placed within the vehicle, or be removably attached to an interior surface of the vehicle as shown in FIG. 2. For example, UE 215-B may be a smart phone removably coupled to a cradle 220 that can be mounted to the interior of the front windshield of the vehicle (as shown in FIG. 2), or to dash pad 210. Cradle 220 may only serve a mechanical function to secure UE 215-B, or may additionally provide electrical functionality to interface with one or more vehicle electronic systems (VESs) within the vehicle, accept vehicle power for charging UE 215-B, and/or provide an interface so that UE 215-B may exchange information with the vehicle's electronics system(s) (VESs). Cradle 220 may provide such an interface using physical connections to one or more VESs based on industry standard interfaces and protocols. Additionally, or alternatively, wireless channels between UE 215-B and the vehicle may be used for interfacing with one or more VESs. UE 215-B may support a variety of wireless interfaces with the vehicle which may include, for example, Bluetooth, Bluetooth Low Energy, Zigbee, Wi-Fi, etc. Additional wireless interfaces may be used, for example, to facilitate the interface of UE 215-B with the vehicle. For example, cradle 220 may use a Near Field Communication (NFC) wireless channel to exchange information with UE 215-B. NFC wireless channel may be used to exchange credentials for verification with route recommendation server 150, trigger processes on UE 215-B, such as, for example, automatically start an application for providing the ability to send travel data and requests for route recommendations and receive route recommendations from route recommendation server 150. Cradle 220 may further provide electrical power to UE 215-B so it may be charged (either inductively or through a physical connection) while mounted within cradle 220.

UE 215-B may include any type of mobile electronic device having communication capabilities, and thus communicate over a network using one or more different channels, including both wired and wireless connections. UE 215-B may include, for example, a cellular (e.g., LTE compatible) mobile phone, a smart phone, a tablet, any type of IP communications device, a laptop computer, or a palmtop computer. In various embodiments, wireless channels over which UE communicates may be supported by any cellular radio access network (RAN), such as, for example, an LTE eUTRAN. In other embodiments, the wireless channels may be supported by a local or wide area wireless network. A local area wireless network may include any type of Wi-Fi (e.g., any IEEE 801.11x network, where x=a, b, c, g, and/or n). A wide area wireless network may include any type wireless network covering larger areas, and may include a mesh network (e.g., IEEE 801.11s) and/or or a WiMAX IEEE 802.16.

In another embodiment, graphic elements (or a graphics display) provided by UE 215 (either UE 215-A or UE 215-B) may be included in a projection 240 generated by HUD unit 230. HUD unit 230 may provide a display which includes a map and/or any other visual information generated by UE 215. Projection 240 may appear to the driver as a translucent image of such a size and character as to not distract the driver from seeing out of the windshield of vehicle interior 200.

Figure 3:
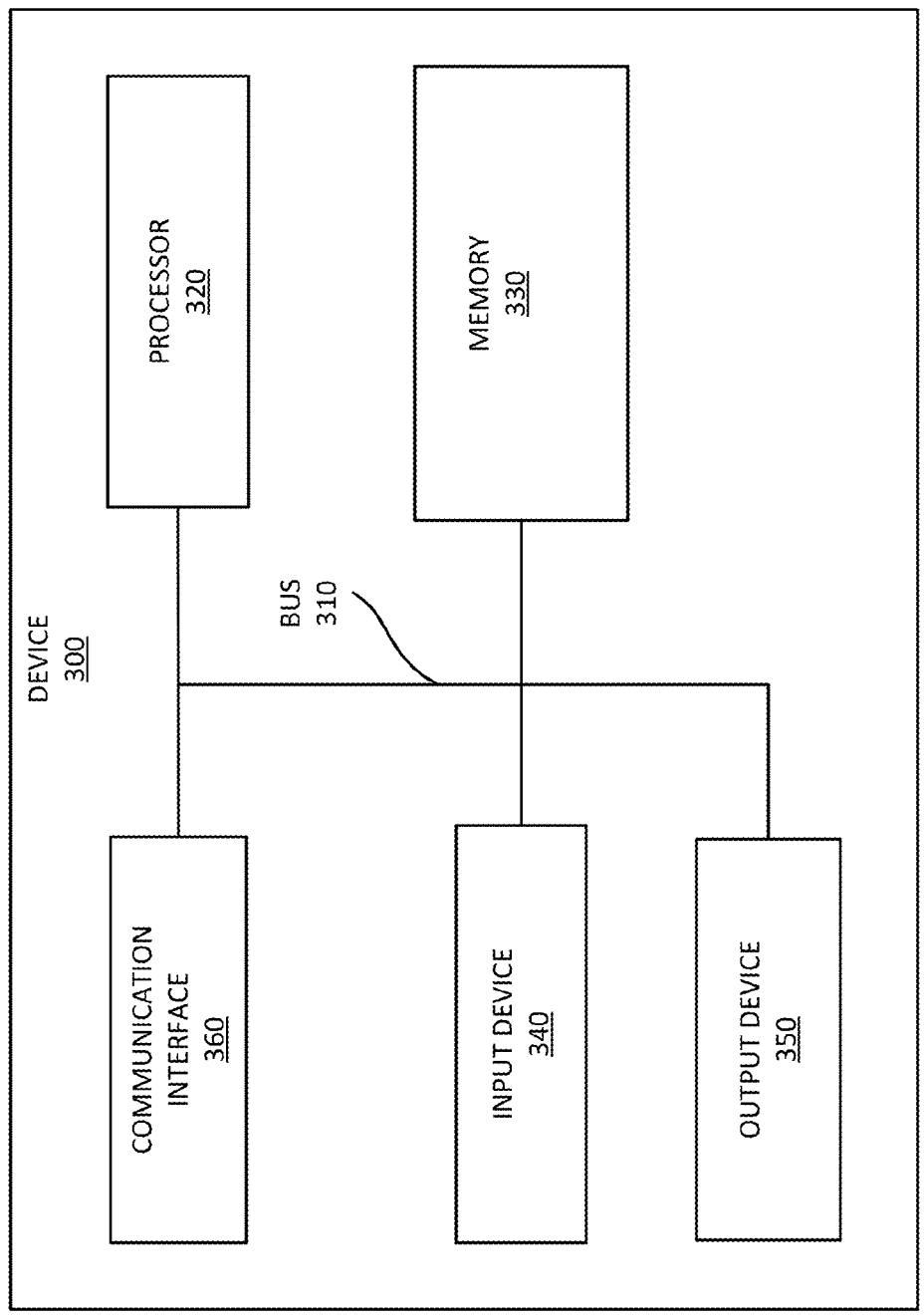
FIG. 3 illustrates an exemplary configuration of one or more of the components of FIG. 1 or 2.

FIG. 3 is a diagram of exemplary components of a device 300. Device 300 may correspond to one or more devices (or components of devices) of FIG. 1 or 2, such as mobile device 110, motor vehicle 120, mobile backhaul 130, EPC 140, route recommendation server 150, and/or access nodes 160. As illustrated, device 300 may include a bus 310, a processor 320, a memory 330, an input device 340, an output device 350, and a communication interface 360. Bus 310 may include a path that permits communication among the components of device 300.

Processor 320 may include one or more processors, microprocessors, or other types of processing units that may interpret and execute instructions. Memory 330 may include a random access memory (RAM) or another type of dynamic storage device that may store information and instructions for execution by processor 320.

Input device 340 may include a mechanism that permits an operator to input information to device 300, such as a remote control, control buttons, a keyboard, a mouse, a pen, a microphone, voice recognition and/or biometric mechanisms, a touch screen, etc. Output device 350 may include a mechanism that outputs information to the operator, including a display, an indicator light, a speaker, etc.

Communication interface 360 may include any transceiver that enables device 300 to communicate with other devices and/or systems. For example, communication interface 360 may include mechanisms for communicating with another device or system via a network, such as network 170.

As described herein, device 300 may perform certain operations in response to processor 320 executing software instructions contained in a computer-readable medium, such as main memory 330. A computer-readable medium may be defined as a non-transitory memory device. A memory device may include space within a single physical memory device or spread across multiple physical memory devices. The software instructions may be read into main memory 330 from another computer-readable medium, or from another device via communication interface 360. The software instructions contained in main memory 330 may cause processor 320 to perform processes described herein. Alternatively, hardwired circuitry may be used in place of or in combination with software instructions to implement processes described herein. Thus, implementations described herein are not limited to any specific combination of hardware circuitry and software.

Figure 4:
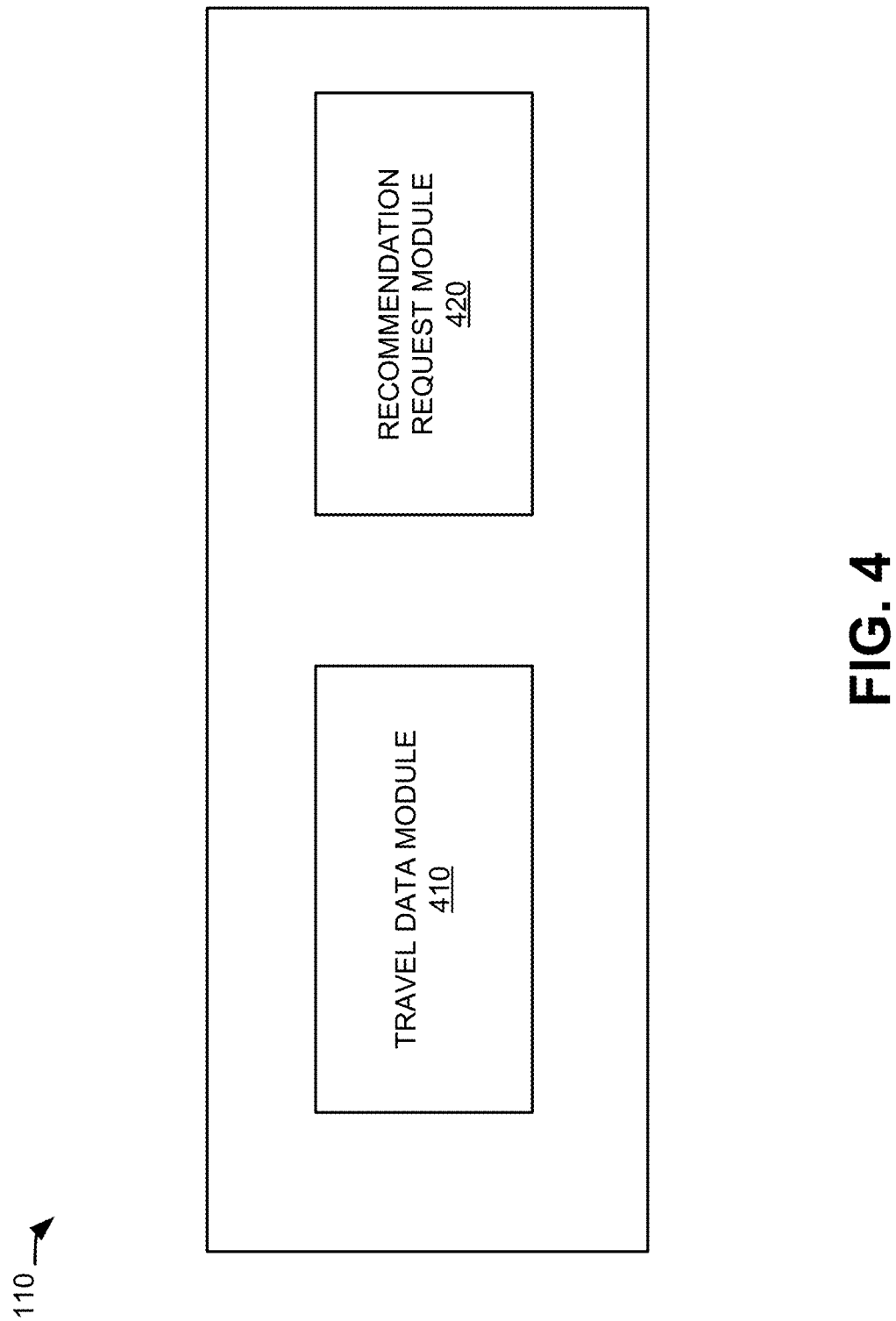
FIG. 4 is a block diagram showing exemplary components of a mobile device according to an embodiment.

FIG. 4 is a block diagram of exemplary functional or logical components of (a route recommendation client stored on) mobile device 110 (e.g., stored in memory 330 of mobile device 110). Mobile device 110 may include travel data module 410, and recommendation request module 420. The configuration of components of mobile device 110 illustrated in FIG. 4 is for illustrative purposes. Mobile device 110 may include additional, fewer and/or different components than those depicted in FIG. 4.

Travel data module 410 may identify travel data associated with mobile device 110 and, in some instances, a particular motor vehicle 120. For example, travel data module 410 may collect GPS location for points along a route including a starting point and destination for each trip that a user makes. Travel data module 410 may collect information regarding intermediate points on each route and the velocity and direction of the motor vehicle 120. In some instances, travel data module 410 may identify the type of destination or intermediate points, such as a gas station, restaurant, etc. Travel data module 410 may identify a date, weekday and time (or time of day) associated with the route. Travel data module 410 may compress the travel data (e.g., based on a predetermined compression and/or encryption format and transmit the travel data to route recommendation server 150 via, for example, network 170.

Recommendation request module 420 may receive user input, such as a destination, and travel data associated with a starting point and/or current location of the user. In some instances, recommendation request module 420 may identify a time at which the user is traveling or allow the user to input a future projected start time at which the user intends to travel. Recommendation request module 420 may send route requests to route recommendation server 150 and receive a selection of recommended routes. The recommended routes may be sorted and filtered based on factors such as speed limits, types of roads, time windows associated with the requested trip, available exits and amenities along the route, etc. Recommendation request module 420 may also allow the user to send details about the travel itinerary and recommended route to a digital address associated with other persons or users, for example via social media applications, email, text, etc.

According to an implementation, recommendation request module 420 may format and display received recommended routes (e.g., via a graphic display of UE described above with respect to FIG. 2) including estimated travel times, intermediate destinations, possible detours, etc. Recommendation request module 420 may allow the user to select to receive recommended routes sorted by a most (or least) used route for a particular time period. Recommendation request module 420 may allow the user to filter routes by time of day, weekday, time of year (e.g., summer), weather pattern (e.g., routes for rainy days), traffic incidents, detours for particular roads (or sections of a particular road), etc. For example, recommendation request module 420 may allow the user to select to receive the most (or least) used route in the last 3 months and the most (or least) used route in the morning.

According to a further implementation, recommendation request module 420 may allow the user to input multiple objectives for intermediate points (e.g., gas, groceries, and other categories of destinations). Recommendation request module 420 may allow the user to set a timeline for particular intermediate stops (e.g., to receive a selection of available sports bars to watch a game at a particular time in a road trip). Recommendation request module 420 may receive recommended routes from route recommendation server 150 based on different criteria included in the route requests, such as a scenic route, a route with particular minimum elevation, etc.

The received routes may be displayed on a display associated with mobile device 110. In some instances, the received recommended routes may be automatically displayed based on a time at which the user begins to travel. For example, a recommended route to an office may be automatically displayed if the user starts to travel during a particular time window on a weekday morning.

Figure 5:
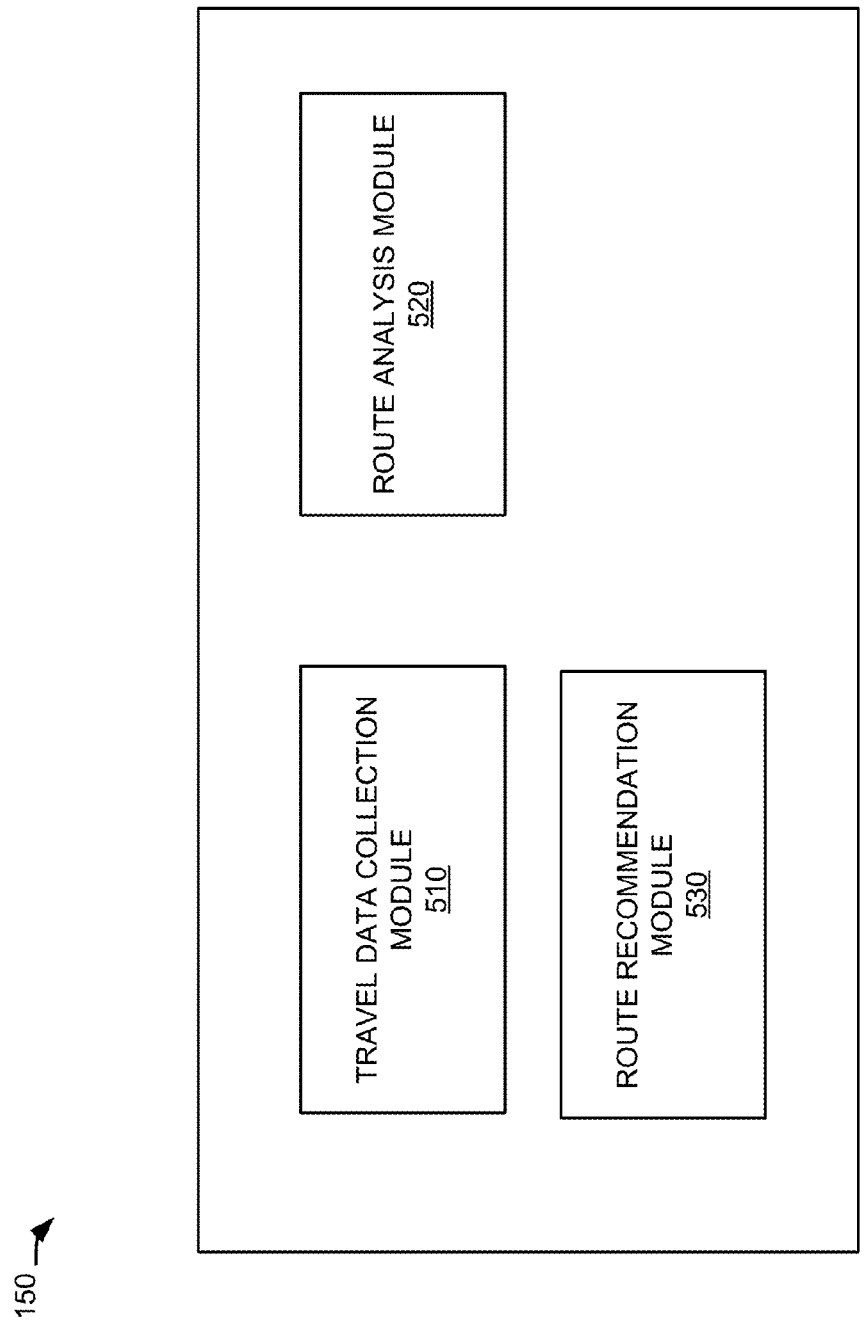
FIG. 5 is a block diagram showing exemplary components of a route recommendation server (RRS)

FIG. 5 is a block diagram of exemplary functional or logical components of route recommendation server 150 (e.g., stored in memory 330 of route recommendation server 150). Route recommendation server 150 may include travel data collection module 510, route analysis module 520, and route recommendation module 530. The configuration of components of route recommendation server 150 illustrated in FIG. 5 is for illustrative purposes. Route recommendation server 150 may include additional, fewer and/or different components than those depicted in FIG. 5.

Travel data collection module 510 may collect and store travel data from users sent from mobile devices 110 via, e.g., network 170. Travel data collection module 510 may compile usage statistics for different routes or segments or routes based on information included in the travel data, such as a time, GPS location, intermediate destinations, etc. Travel data collection module 510 may index the routes based on a time of day, a time of year, types of roads, availability of detours, etc.

Route analysis module 520 may analyze travel data from different mobile devices 110 (and motor vehicles 120) to identify a number of users that use a particular segment of routes, such as described below with respect to FIG. 6. Route analysis module 520 may determine a number of users following a particular route from a source (e.g., a first GPS location) to a destination (e.g., a second GPS location). Route analysis module 520 may classify different routes according to a relative time of trip.

Figure 7:
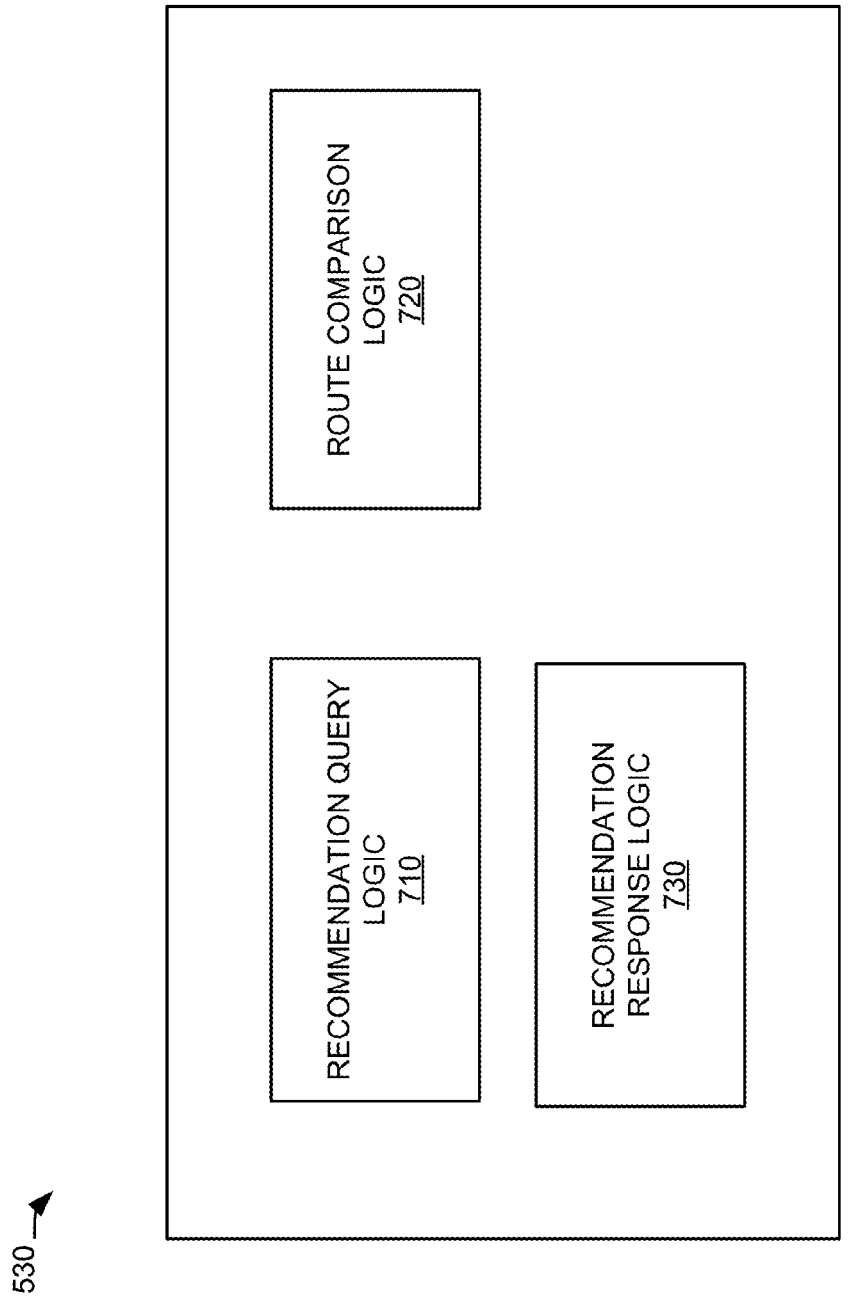
FIG. 7 depicts a functional block diagram of the route recommendation module of FIG. 5.

Route recommendation module 530 may provide recommendations for routes in response to requests from mobile devices 110, such as described with respect to FIG. 7. Route recommendation server 150 may find a number of users following a certain route from a starting point (e.g., a starting point A, which may be a current GPS location of a mobile device 110 or an address input by the user) to a destination (e.g., a destination address B, which may be input by the user). Route recommendation module 530 may receive requests when the user searches for a recommended route. Route recommendation module 530 may retrieve usage statistics associated with travel between the starting point and destination and determine the relative optimality of alternative routes based on variables and objectives provided by the system and user (e.g., minimum distance, minimum time, avoid toll roads, etc.). Route recommendation module 530 may provide a recommendation (or suggestion) of a most optimal route and, in some instances, alternative routes.

Route recommendation module 530 may determine recommendations based on (segments of) routes traveled by previous users (or mobile devices 110) that correspond to a requested itinerary. The requested itinerary may include multiple destinations and/or objectives (e.g., gas, groceries, etc.). For example, the requested itinerary may include a main destination and an objective to stop for gas. The gas station may be selected based on the effect on the optimal route.

Figure 6:
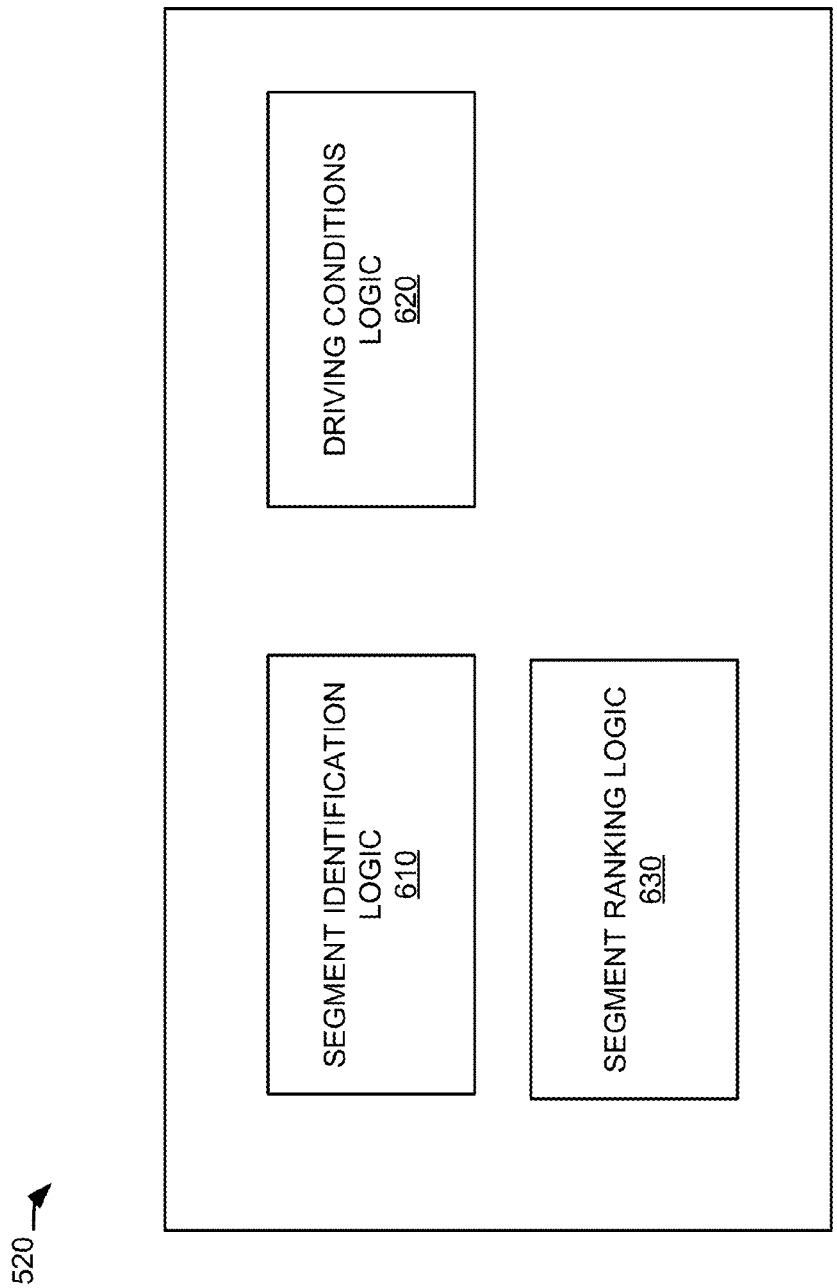
FIG. 6 depicts a functional block diagram of the route analysis module of FIG. 5.

FIG. 6 is an exemplary functional block diagram of route analysis module 520. As shown in FIG. 6, route analysis module 520 may include segment identification logic 610, driving conditions logic 620 and segment ranking logic 630. Other configurations may be implemented. Therefore, route analysis module 520 may include additional, fewer and/or different components than those depicted in FIG. 6.

Segment identification logic 610 may receive travel data from mobile devices 110. Segment identification logic 610 may analyze the travel data to identify segments of each route. For example, segment identification logic may access mapping information (e.g., from a secondary source or database) and parse the travel data to determine particular segments (e.g., a portion of a highway from a particular exit, at which the user may enter the highway, to another exit, at which the user may leave the highway). Segment identification logic 610 may store data identifying travel time along various segments during different time windows (e.g., mornings, weekends, etc.). Segment identification logic 610 may identify whether a particular segment includes a toll road, a highway, a local road, etc.

Driving conditions logic 620 may identify driving conditions associated with each particular travel data set provided by mobile devices 110. For example, driving conditions logic 620 may interface with additional systems (not shown) that provide information relevant to a particular instance of driving, such as weather conditions (e.g., rain, snow, etc.), reported accidents, local events (e.g., a football game, concert, etc.), closure of alternate routes, etc. Driving conditions logic 620 may identify anomalies that may affect a particular travel data set (or driving instance).

Segment ranking logic 630 may rank segments of a route (e.g., a particular section of a highway or road) based on the popularity of a particular route among the users of mobile devices 110. Segment ranking logic 630 may also provide additional rankings based on factors relevant to the user, such as overall time, distance, number of stops, etc. Segment ranking logic 630 may identify a number of users that use a particular segment during a particular time window. Segment ranking logic 630 may also extrapolate traffic volume based on the number of users that travel along that segment (e.g., an estimate based on the percentage of drivers that are users of the route recommendation system).

FIG. 7 is an exemplary functional block diagram of route recommendation module 530. As shown in FIG. 7, route recommendation module 530 may include recommendation query logic 710, route comparison logic 720 and recommendation response logic 730. Other configurations may be implemented. Therefore, route recommendation module 530 may include additional, fewer and/or different components than those depicted in FIG. 7.

Recommendation query logic 710 may receive requests for recommendations in instances in which a user searches for a recommended route (i.e., sends a recommendation request from mobile device 110 via network 170). For example, recommendation query logic 710 may receive a current GPS location or other starting point, a destination, and a time at which the trip is to begin (e.g., the present time or an upcoming time input by the user).

Route comparison logic 720 may retrieve usage statistics associated with the requested trip. Route comparison logic 720 may determine a most popular route based on a number of users (i.e., mobile devices 110) that use each particular route during a corresponding time window (e.g., the corresponding time window for a preceding three month period, etc.). Route comparison logic 720 may also determine a most optimal route based on factors relevant to the users, such as time, distance, etc. Route comparison logic 720 may provide additional weighting to more recent travel data sets when calculating a most popular and/or most optimal route. Route comparison logic 720 may combine segments from different mobile devices 110 to determine an overall popularity associated with the requested route.

Route comparison logic 720 may normalize the combined data sets for conditions relevant to the requested travel time, such as weather (e.g., providing additional weighting to other rainy days if it is currently raining), construction, etc. Route comparison logic 720 may determine a most (or least) used route for a particular time period. Route comparison logic 720 may apply different filters to the data based on automatic (predetermined) settings or input provided by the mobile device 110 (e.g., most/least used route in the last week or most/least used route in the morning).

Recommendation response logic 730 may provide a response to the recommendation request from the mobile device 110. Recommendation response logic 730 may provide information regarding recommended routes, such as an average number of users that follow a particular route from a source A to a destination B. Recommendation response logic 730 may also provide other recommended route at that time of the day with additional statistics over a particular time period. Recommendation response logic 730 may provide a recommendation based on weather conditions associated with the particular trip.

Figure 8:
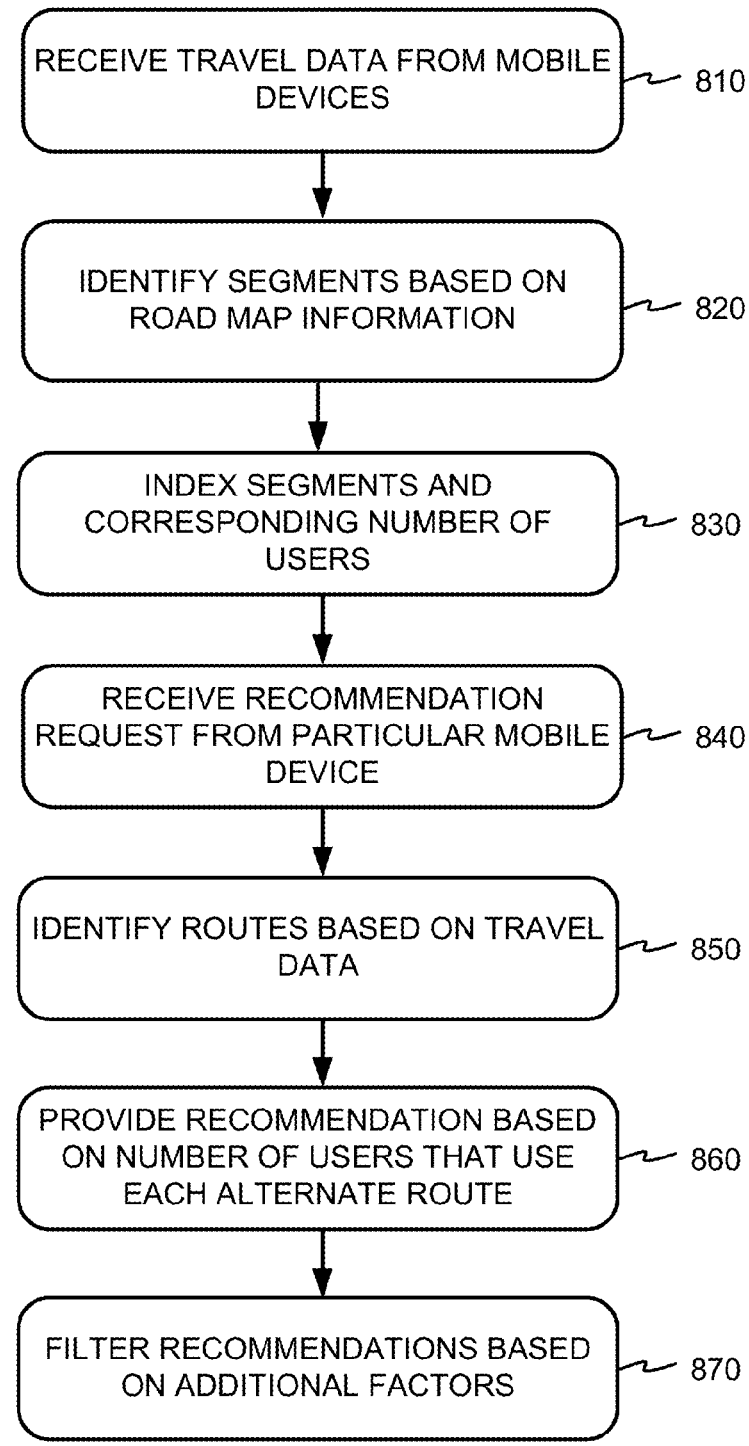
FIG. 8 is a flow chart showing an exemplary process for providing route recommendations based on a number of users that use each of multiple routes.

FIG. 8 is a flow chart showing an exemplary process 800 for providing route recommendations based on the popularity of routes associated with mobile devices 110. Process 800 may be performed by route recommendation server 150, and actions within the process may be performed, at least in part, by recommendation server 150.

Route recommendation server 150 may receive travel data from mobile devices 110 (Block 810). For example, route recommendation server 150 may receive the travel data from each mobile device 110 based on routes traveled by users that activate the route recommendation application on mobile device 110. Route recommendation server may receive a time and a GPS location of the mobile device 110, which may be updated as the user travels.

Route recommendation server 150 may identify segments of routes based on road map information (Block 820). For example, route recommendation server may match a GPS location of each particular mobile device 110 to coordinates associated with a road map. At block 830, route recommendation server 150 may index a number of users that travel a particular route based on factors such as a particular weekday, a time window, etc. Route recommendation server 150 may also index each segment based on a type of road (e.g., highway, local road, toll road, etc.)

Route recommendation server 150 may receive a recommendation request from a particular mobile device 110 (Block 840). For example, a user may request a route recommendation for a trip between a starting point and a destination at a particular time. The recommendation request may include GPS locations of the starting point and the destination. The recommendation request may also include a projected start time and road preferences. The projected start time may be a time later than a current time (e.g., a following morning).

Route recommendation server 150 may identify alternate routes for the requested trip between the starting point and destination (Block 850). For example, route recommendation server 150 may search among the indexed segments and identify routes based on particular segments or combinations of segments. Route recommendation server 150 may combine segments from different mobile devices 110 to determine recommended routes. For example, if the user requests a route from A to B, route recommendation server 150 may identify a first mobile device 110 (i.e., an associated motor vehicle 120) that travels from A to C to D and a second mobile device 110 that travels from C to B. Route recommendation server 150 may combine portions of both routes to determine a route of A to C to B.

Route recommendation server 150 may provide recommendations based on a number of users that use each alternate route (Block 860). Route recommendation server 150 may also identify an optimal route (or the relative optimality of routes) based on factors or combinations of factors, such as time, speed limits, distance, etc.

At block 870, route recommendation server 150 may allow the user to filter recommendations based on additional factors, such as a type of road, scenic view preference, etc. Route recommendation server 150 may also provide an optimal time window for the user to begin the trip based on averaged times for particular routes in preceding corresponding time periods.

The foregoing description of implementations provides illustration and description, but is not intended to be exhaustive or to limit the invention to the precise form disclosed. Modifications and variations are possible in light of the above teachings or may be acquired from practice of the invention. For example, while series of messages and/or blocks have been described with regard to FIG. 8, the order of the messages and/or blocks may be modified in other embodiments. Further, non-dependent messaging and/or processing blocks may be performed in parallel.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

The terms "comprises" and/or "comprising," as used herein specify the presence of stated features, integers, steps or components but does not preclude the presence or addition of one or more other features, integers, steps, components, or groups thereof Further, the term "exemplary" (e.g., "exemplary embodiment," "exemplary configuration," etc.) means "as an example" and does not mean "preferred," "best," or likewise.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A computer-implemented method, comprising:
   receiving, at a route recommendation server device via a network, travel data from users of a route recommendation application activated on a plurality of mobile devices;
   parsing the travel data to identify previously-traveled route segments of a plurality of routes traveled by the users;
   indexing the plurality of previously-traveled route segments based on a popularity factor corresponding to a number of the users for each of the plurality of previously-traveled route segments at a plurality of time periods;
   ranking the indexed route segments based on the popularity factor;
   receiving, via the network, a recommendation request from a first mobile device, wherein the recommendation request includes a starting point and a destination for a trip;
   searching the ranked route segments to identify combinations of the previously-traveled route segments connecting the starting point to the destination;
   identifying a plurality of prospective routes between the starting point and the destination based on the identified combinations of the previously-traveled route segments; and
   providing, to the first mobile device via the network, at least one recommendation for a first recommended prospective route and a second recommended prospective route, from the plurality of identified prospective routes between the starting point and the destination, which is determined based on a comparison of the identified combinations of the previously-traveled route segments, wherein the providing includes:
   providing the first recommended prospective route corresponding to a most-traveled route between the starting point and the destination and the second recommended prospective route corresponding to a least-traveled route between the starting point and the destination.

2. The computer-implemented method of claim 1, further comprising:
   filtering the plurality of identified prospective routes based on at least one additional factor, wherein the at least one additional factor includes historical accident information.

3. The computer-implemented method of claim 1, further comprising:
   identifying each of the plurality of previously-traveled route segments further based on road map information.

4. The computer-implemented method of claim 1, further comprising:
   receiving, via the network, a command from a user to send the at least one recommendation to a digital address; and
   sending, via the network, the at least one recommendation to the digital address.

5. The computer-implemented method of claim 1, wherein the recommendation request includes multiple destinations.

6. The computer-implemented method of claim 1, wherein receiving the recommendation request further comprises:
   receiving a projected start time for the trip.

7. The computer-implemented method of claim 1, further comprising:
   providing the at least one recommendation based on safety condition information associated with each of the plurality of identified prospective routes.

8. The computer-implemented method of claim 1, wherein providing the at least one recommendation further comprises:
   providing the at least one recommendation based on a time of day of the trip.

9. The computer-implemented method of claim 1, wherein providing the at least one recommendation further comprises:
   performing the comparison of the identified combinations of the previously-traveled route segments, wherein the previously-traveled route segments are weighted based on a recency of corresponding travel data.

10. The computer-implemented method of claim 1, further comprising:
    providing the at least one recommendation based on weather conditions associated with the trip.

11. A route recommendation server device, comprising:
    a memory configured to store instructions; and
    a processor configured to execute the instructions stored in the memory to:
    receive, via network, travel data from users of a route recommendation application activated on a plurality of mobile devices;
    parse the travel data to identify previously-traveled route segments of a plurality of routes traveled by the users;
    index the plurality of previously-traveled route segments based on a popularity factor corresponding to a number of the users for each of the plurality of previously-traveled route segments at a plurality of time periods;
    rank the indexed route segments based on the popularity factor;
    receive, via the network, a recommendation request from a first mobile device, wherein the recommendation request includes a starting point and a destination for a trip;
    search the ranked route segments to identify combinations of the previously-traveled route segments connecting the starting point to the destination;
    identify a plurality of travel routes between the starting point and the destination based on the identified combinations of the previously-traveled route segments; and
    provide, to the first mobile device via the network, at least one recommendation for a first recommended travel route and a second recommended travel route, from the plurality of identified prospective routes between the starting point and the destination, which are determined based on a comparison of the identified combinations of the previously-traveled route segments, wherein the first recommended prospective route corresponds to a most-traveled route between the starting point and the destination and the second recommended prospective route corresponds to a least-traveled route between the starting point and the destination.

12. The route recommendation server device of claim 11, further comprising instructions which cause the processor to:
filter the plurality of identified prospective routes based on at least one additional factor, wherein the at least one additional factor includes historical accident information.

13. The route recommendation server device of claim 11, further comprising instructions which cause the processor to:
identify each of the plurality of previously-traveled route segments further based on road map information.

14. The route recommendation server device of claim 11, further comprising instructions which cause the processor to:
receive, via the network, a command from a user to send the at least one recommendation to a digital address; and
send, via the network, the at least one recommendation to the digital address.

15. The route recommendation server device of claim 11, wherein the recommendation request includes multiple destinations.

16. The route recommendation server device of claim 11, wherein the instructions to receive the recommendation request cause the processor to:
receive a projected start time for the trip.

17. The route recommendation server device of claim 11, wherein the instructions to provide the at least one recommendation comprise instructions which cause the processor to:
provide the at least one recommendation based on safety condition information associated with each of the plurality of identified prospective routes.

18. The route recommendation server device of claim 11, wherein the instructions to provide the at least one recommendation comprise instructions which cause the processor to:
perform the comparison of the identified combinations of the previously-traveled route segments, wherein the previously-traveled route segments are weighted based on a recency of corresponding travel data.

19. The route recommendation server device of claim 11, wherein the instructions to provide the at least one recommendation comprise instructions which cause the processor to:
provide the at least one recommendation based on weather conditions associated with the trip.

20. A non-transitory computer-readable medium including instructions to be executed by a processor, the instructions including one or more instructions, when executed by the processor, for causing the processor to:
receive, via a network, travel data from users of a route recommendation application activated on a plurality of mobile devices;
parse the travel data to identify previously-traveled route segments of a plurality of routes traveled by the users;
index the plurality of previously-traveled route segments based on a popularity factor corresponding to a number of the users for each of the plurality of previously-traveled route segments at a plurality of time periods;
rank the indexed route segments based on the popularity factor;
receive, via the network, a recommendation request from a first mobile device, wherein the recommendation request includes a starting point and a destination for a trip;
search the ranked route segments to identify combinations of the previously-traveled route segments connecting the starting point to the destination;
identify a plurality of prospective routes between the starting point and the destination based on the identified combinations of the previously-traveled route segments; and
provide, to the first mobile device via the network, at least one recommendation for a first recommended prospective route and a second recommended prospective route, from the plurality of identified prospective routes between the starting point and the destination, which are determined based on a comparison of the identified combinations of the previously-traveled route segments, wherein the first recommended prospective route corresponds to a most-traveled route between the starting point and the destination and the second recommended prospective route corresponds to a least-traveled route between the starting point and the destination.

* * * * *